US009401970B2

(12) United States Patent
Liu

(10) Patent No.: US 9,401,970 B2
(45) Date of Patent: Jul. 26, 2016

(54) SYSTEM, METHOD AND ENGINE FOR GROUP COMMUNICATION

(71) Applicant: Cybeye, Inc., Torrance, CA (US)

(72) Inventor: Bing Liu, Rolling Hills, CA (US)

(73) Assignee: CYBEYE, INC., Torrance, CA (US)

( * ) Notice: Subject to any disclaimer, the term of this patent is extended or adjusted under 35 U.S.C. 154(b) by 88 days.

(21) Appl. No.: 14/215,190

(22) Filed: Mar. 17, 2014

(65) Prior Publication Data

US 2014/0289330 A1 Sep. 25, 2014

Related U.S. Application Data

(60) Provisional application No. 61/788,058, filed on Mar. 15, 2013.

(51) Int. Cl.
| | |
|---|---|
| *G06F 13/00* | (2006.01) |
| *H04L 29/08* | (2006.01) |
| *G06F 17/30* | (2006.01) |
| *H04L 12/58* | (2006.01) |
| *G06Q 50/00* | (2012.01) |
| *H04L 29/12* | (2006.01) |

(52) U.S. Cl.
CPC ............ *H04L 67/306* (2013.01); *G06F 17/30* (2013.01); *G06F 17/30861* (2013.01); *G06Q 50/01* (2013.01); *H04L 51/00* (2013.01); *H04L 51/32* (2013.01); *H04L 61/30* (2013.01); *H04L 67/02* (2013.01)

(58) Field of Classification Search
CPC ....... G06Q 10/10; G06Q 30/02; G06Q 50/01; H04L 29/06; H04L 29/08072; H04L 29/06027; H04L 12/581; H04L 51/00; H04L 51/32; H04L 61/00; H04L 67/02; H04L 67/306; G06F 17/30864; G06F 17/30867; G06F 17/30011; G06F 17/30; G06F 17/30861
USPC .......................................... 707/736; 709/204
See application file for complete search history.

(56) References Cited

U.S. PATENT DOCUMENTS

| | | | |
|---|---|---|---|
| 2007/0150603 A1* | 6/2007 | Crull ................... | G06F 17/3089 709/227 |
| 2010/0138293 A1 | 6/2010 | Ramer et al. | |
| 2010/0268585 A1 | 10/2010 | Padveen et al. | |
| 2010/0274815 A1 | 10/2010 | Vanasco | |
| 2013/0103686 A1* | 4/2013 | Sisneros ........... | G06F 17/30867 707/736 |
| 2013/0218965 A1* | 8/2013 | Abrol ..................... | H04L 67/22 709/204 |

* cited by examiner

*Primary Examiner* — Robert B Harrell
(74) *Attorney, Agent, or Firm* — Barnes & Thornburg LLP; Thomas J. McWilliams; Edward F. Behm, Jr.

(57) ABSTRACT

An engine, system and method for a domain social network that interconnects Internet users with at least domains owned by or of interest to those Internet users, and that may obtain and/or forward obtained dynamic data regarding those domains automatically, such as by web service or email service. The dynamic data may be used to filter and protect content and data of the respective domains, to protect users by identifying low quality web pages or malicious software or pages, to isolate or improve search results regarding the domain, and/or to improve Internet-based transaction flow, such as the creation of advertising.

7 Claims, 24 Drawing Sheets

The latest discoveries about avoos.com

1. Dlicious founder on site's potential: 'The time has passed' - SeeNN.com - 4 day ago
Source: seenn.com, Rank: #47. The related websites in the the page: avoos.com 2. Why Every Single Person Should Take 30 Seconds to Opt-in to the Dlicious Data Transfer - 5 day ago
Source: wreadwriteweb.com, Rank: #1459. The related websites in the page: avoos.com 3. AVOOS Purchases Dlicious from Yahee - 6 day ago
Source: teknorati.com, Rank: #861. The related websites in the page: avoos.com 4. YouCube Founders Are Back, and Have Bought Dlicious from Yahee [NetworkAffect] - 6 day ago
Source: allthingsdee.com, Rank: #3637. The related websites in the page: avoos.com 5. Dlicious Has New Owners: YouCube Founders Chadd Hurly and Steph Chehn - 7 day ago
Source: wreadwriteweb.com, Rank: #1459. The related websites in the page: avoos.com Total 6 records in 2 pages 1 2

FIG. 5

▶ Premium subscription expiration date: 2014-04-22

■ The latest down time from your followed websites:

1. glassdoer.com has not been accessible in 17 hr ago.

■ The latest social discoveries from your followed websites:

1. (53/1) Startups: How to Communicate Traction ... by Branden Bakker - Quorah - 2 day ago
Source: biznezinsider.com. Rank: #524. The related website in the page: quorah.com 2. Adhesive ? A Sticky New Faundry Group Theme - 2 day ago
Source: biznezinsider.com. Rank: #524. The related website in the page: gnipp.com 3 Former Deman Media exec Pall Stanure emerges at stealthy Doughnuts Inc. - 3 day ago
Source: glikwire.com. Rank: #23086. The related websites in the page: dmandia.com 4. Mobile Dew News Round-Up, AR on Adnoid, API for Instant App Making & More - 5 day ago
Source: wreadwriteweb.com. Rank: #1459. The related websites in the page: gitjar.com Show By [Hot company ▼]

| | | |
|---|---|---|
| 1. quorah.com | 775 | 48 day |
| 2. ubrmedia.com | 374,292 | 74 day |
| 3. gitjar.com | 3,556 | 78 day |
| 4. apitalism.com | 277,919 | 81 day |
| 5. glassdoer.com | 2,612 | 82 day |
| 6. gnipp.com | 126,248 | 87 day |
| 7. mextint.com | 393,725 | 92 day |
| 8. dmandia.com | 17,761 | 98 day |

Add New Topic

Increase Online Business - advertise here
Connect w/ Peope Who Search for You!
Vieamedia Online Can Help

Free Business Advertising - follow link

Easy, Smart, FREE! Just add the bookmarklette to your web browser to enjoy WoneClick of check, like, share or follow when you surf to any web page.

Step 1. Make sure to enable bookmark bar / favorite bar in your browser. If not visible, go to Tool menu to enable it.
Step 2. Go to http://www.mitracking.com/MyAccount and from its right top corner drag MiTracking link to your bookmark bar / favorite bar or right click on MiTracking link to add it to your favorite bar when using Interweb Explorer or its compatible browsers.

Now you have MiTracking bookmark ready to use. When you visit any web page, click MiTracking bookmark you will see the web page information with Mi Like, Tweeter, Facebook recommend as well as the information about the website recommend and etc. to share the web page with your friends instantly!. You could follow any website for its social activities and comprehensive website report powered by over 8 million domain data.

Sign up free member account with your email address or if you have Facebook account already, just login with Facebook and allow you to access our service for free.

Enjoy and tell your friends!

P.S. for iFone, iPhad or other smartphone or tablet computer users those devices may not support drag and drop to add to bookmark / favorite bar, please follow the instructions at http://www.mitracking.com/MyAccount page.

FIG. 7

SYSTEM, METHOD AND ENGINE FOR GROUP COMMUNICATION

CROSS-REFERENCE TO RELATED APPLICATIONS

This application claims priority to U.S. Provisional Patent Application Ser. No. 61/788,058, entitled System, Method and Engine for Group Communication, the entirety of which is incorporated herein by reference as if set forth herein in its entirety.

FIELD OF THE INVENTION

The present invention relates to data tracked and provided in relation to Internet browsing, and, more particularly, to an engine, system and method of providing a domain social network having business intelligence logic.

BACKGROUND OF THE INVENTION

The term "Web 2.0" is commonly associated with web applications that facilitate interactive information sharing, interoperability, user-centered design, and collaboration on the World Wide Web (WWW, also referred to hereinafter as the Internet or a network, further includes intranet, extranet, and the like). Web 2.0 thus necessarily includes aspects of connecting non-virtual identity to virtual identity on the WWW using a data feed comprised of data relationships and business and data intelligence. As used hereinthroughout, and unless otherwise noted, the term "identity" is defined to include non-virtual and/or virtual aspects of a person interacting on, with, or with others on, the WWW.

In an example of a typical social network, Facebook® connects an identity with other persons based on, for example, friendship. Further, persons using a social network platform such as the Facebook platform may generate activities, events, and the like, as indicated from the respective Facebook account associated with each respective identity. Once generated, the Facebook platform may automatically feed friends' activities, events, and the like to third person friends of the identity, such as when such activities or events are occurring or have occurred.

However, Facebook connects persons to persons, or persons/entities (such as businesses) to person/entities. Facebook does not provide any interconnection for domains associated with those persons or entities. Thus, in typical social environments such as Facebook, persons/entities generate and receive the data. That is, the Facebook platform feeds data to and from the friends identified as being associated with each identity. Needless to say, data generated in this way, and absent data monitoring regarding domain names associated with the persons/entities on Facebook, severely limits the usefulness of the data generated by such typical social sites—particularly for advertising purposes, for example.

Further, there are over 200 million domains as of 2010, and over 1.8 billion web users. These users are running approximately 15 billion web searches a year, which leads each user to 2-3 unknown websites per day, on average. Such websites, if unknown to the user and without any way for the user to have a trusted party (such as a social network friend, or a trusted domain) that indicates the acceptability of the unknown site, may pose a risk to users, such as an increased likelihood of phishing or providing malware.

Thus, there is a need for a "domain social network" that interconnects data regarding identities (i.e., persons/entities) to data regarding domains. More particularly, there is a need for an engine, system and method to generate domain data using, and that itself provides business intelligence logic, wherein data is related, such as for sales, advertising or trustworthiness, purposes, to an identity's activity.

SUMMARY

The present invention provides an engine, system and method for a domain social network that interconnects Internet users with at least domains owned by or of interest to those Internet users, and that may obtain and/or forward obtained dynamic data regarding those domains automatically, such as by web service or email service. The dynamic data may be used to filter and protect content and data of the respective domains, to protect users by identifying low quality web pages or malicious software or pages, to isolate or improve search results regarding the domain, and/or to improve Internet-based transaction flow, such as the creation of advertising.

It is to be understood that both the foregoing general description and the following detailed description are exemplary and explanatory, and are intended to provide further explanation of the invention as discussed hereinthroughout.

BRIEF DESCRIPTION OF THE DRAWINGS

The accompanying drawings are included to provide a further understanding of the disclosed embodiments. In the drawings:

FIG. 5 is an illustration of aspects of the present invention;
FIG. 6 is an illustration of aspects of the present invention;
FIG. 7 is an illustration of aspects of the present invention.

DETAILED DESCRIPTION

A computer-implemented platform and methods of use are disclosed that provide networked access to a plurality of types of digital content, including but not limited to video, audio, and document content, and that track and deliver the accessed content. Described embodiments are intended to be exemplary and not limiting. As such, it is contemplated that the herein described systems and methods can be adapted to provide many types of users with access and delivery of many types of domain data, and can be extended to provide enhancements and/or additions to the exemplary services described. The invention is intended to include all such extensions. Reference will now be made in detail to various exemplary and illustrative embodiments of the present invention.

Figure 1:
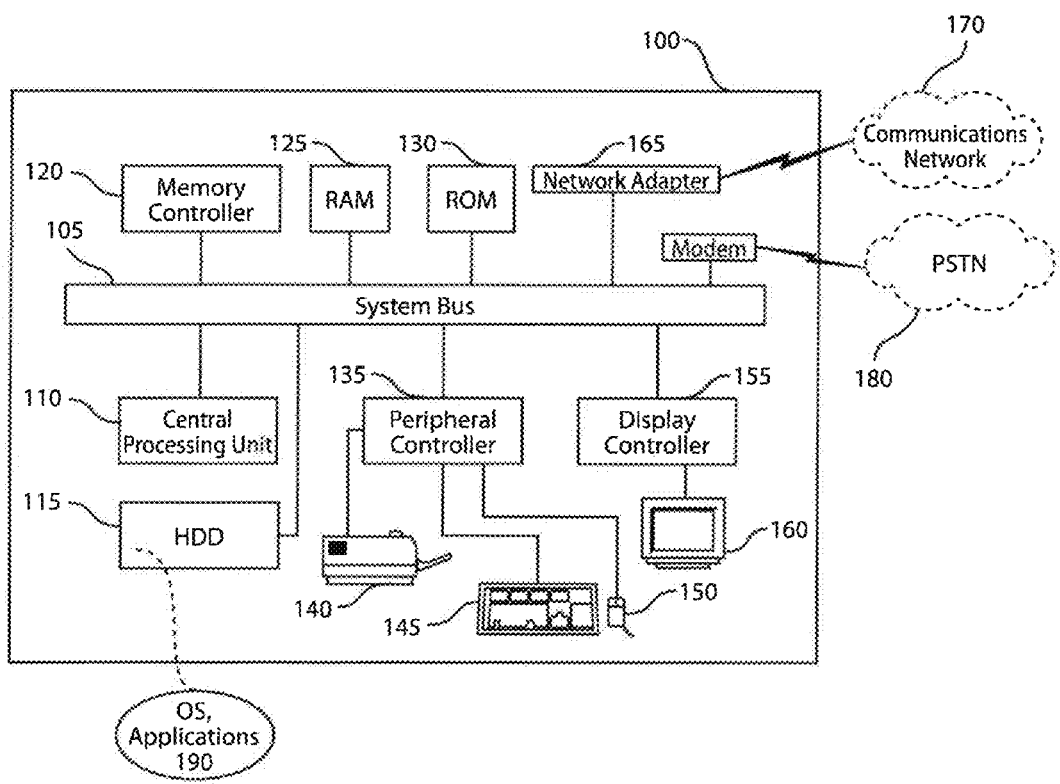
FIG. 1 is a block diagram of an exemplary computing system for use in accordance with herein described systems and methods.

FIG. 1 depicts an exemplary computing system 100 that can be used in accordance with herein described system and methods. Computing system 100 is capable of executing software, such as an operating system (OS) and a variety of computing applications 190. The operation of exemplary computing system 100 is controlled primarily by computer readable instructions, such as instructions stored in a computer readable storage medium, such as hard disk drive (HDD) 115, optical disk (not shown) such as a CD or DVD, solid state drive (not shown) such as a USB "thumb drive," or the like. Such instructions may be executed within central processing unit (CPU) 110 to cause computing system 100 to perform operations. In many known computer servers, workstations, personal computers, and the like, CPU 110 is implemented in an integrated circuit called a processor.

It is appreciated that, although exemplary computing system 100 is shown to comprise a single CPU 110, such description is merely illustrative as computing system 100 may comprise a plurality of CPUs 110. Additionally, computing system 100 may exploit the resources of remote CPUs (not shown), for example, through communications network 170 or some other data communications means.

In operation, CPU 110 fetches, decodes, and executes instructions from a computer readable storage medium such as HDD 115. Such instructions can be included in software such as an operating system (OS), executable programs, and the like. Information, such as computer instructions and other computer readable data, is transferred between components of computing system 100 via the system's main data-transfer path. The main data-transfer path may use a system bus architecture 105, although other computer architectures (not shown) can be used, such as architectures using serializers and deserializers and crossbar switches to communicate data between devices over serial communication paths. System bus 105 can include data lines for sending data, address lines for sending addresses, and control lines for sending interrupts and for operating the system bus. Some busses provide bus arbitration that regulates access to the bus by extension cards, controllers, and CPU 110. Devices that attach to the busses and arbitrate access to the bus are called bus masters. Bus master support also allows multiprocessor configurations of the busses to be created by the addition of bus master adapters containing processors and support chips.

Memory devices coupled to system bus 105 can include random access memory (RAM) 125 and read only memory (ROM) 130. Such memories include circuitry that allows information to be stored and retrieved. ROMs 130 generally contain stored data that cannot be modified. Data stored in RAM 125 can be read or changed by CPU 110 or other hardware devices. Access to RAM 125 and/or ROM 130 may be controlled by memory controller 120. Memory controller 120 may provide an address translation function that translates virtual addresses into physical addresses as instructions are executed. Memory controller 120 may also provide a memory protection function that isolates processes within the system and isolates system processes from user processes. Thus, a program running in user mode can normally access only memory mapped by its own process virtual address space; it cannot access memory within another process' virtual address space unless memory sharing between the processes has been set up.

In addition, computing system 100 may contain peripheral controller 135 responsible for communicating instructions using a peripheral bus from CPU 110 to peripherals, such as printer 140, keyboard 145, and mouse 150. An example of a peripheral bus is the Peripheral Component Interconnect (PCI) bus.

Display 160, which is controlled by display controller 155, can be used to display visual output generated by computing system 100. Such visual output may include text, graphics, animated graphics, and/or video, for example. Display 160 may be implemented with a CRT-based video display, an LCD-based flat-panel display, gas plasma-based flat-panel display, touch-panel, or the like. Display controller 155 includes electronic components required to generate a video signal that is sent to display 160.

Further, computing system 100 may contain network adapter 165 which may be used to couple computing system 100 to an external communication network 170, which may include or provide access to the Internet, and hence which may provide or include tracking of and access to the domain data discussed herein. Communications network 170 may provide user access to computing system 100 with means of communicating and transferring software and information electronically. For example, users may communicate with computing system 100 using communication means such as email, direct data connection, virtual private network (VPN), Skype or other online video conferencing services, or the like. Additionally, communications network 170 may provide for distributed processing, which involves several computers and the sharing of workloads or cooperative efforts in performing a task. It is appreciated that the network connections shown are exemplary and other means of establishing communications links between computing system 100 and remote users may be used.

It is appreciated that exemplary computing system 100 is merely illustrative of a computing environment in which the herein described systems and methods may operate and does not limit the implementation of the herein described systems and methods in computing environments having differing components and configurations, as the inventive concepts described herein may be implemented in various computing environments using various components and configurations.

Figure 2:
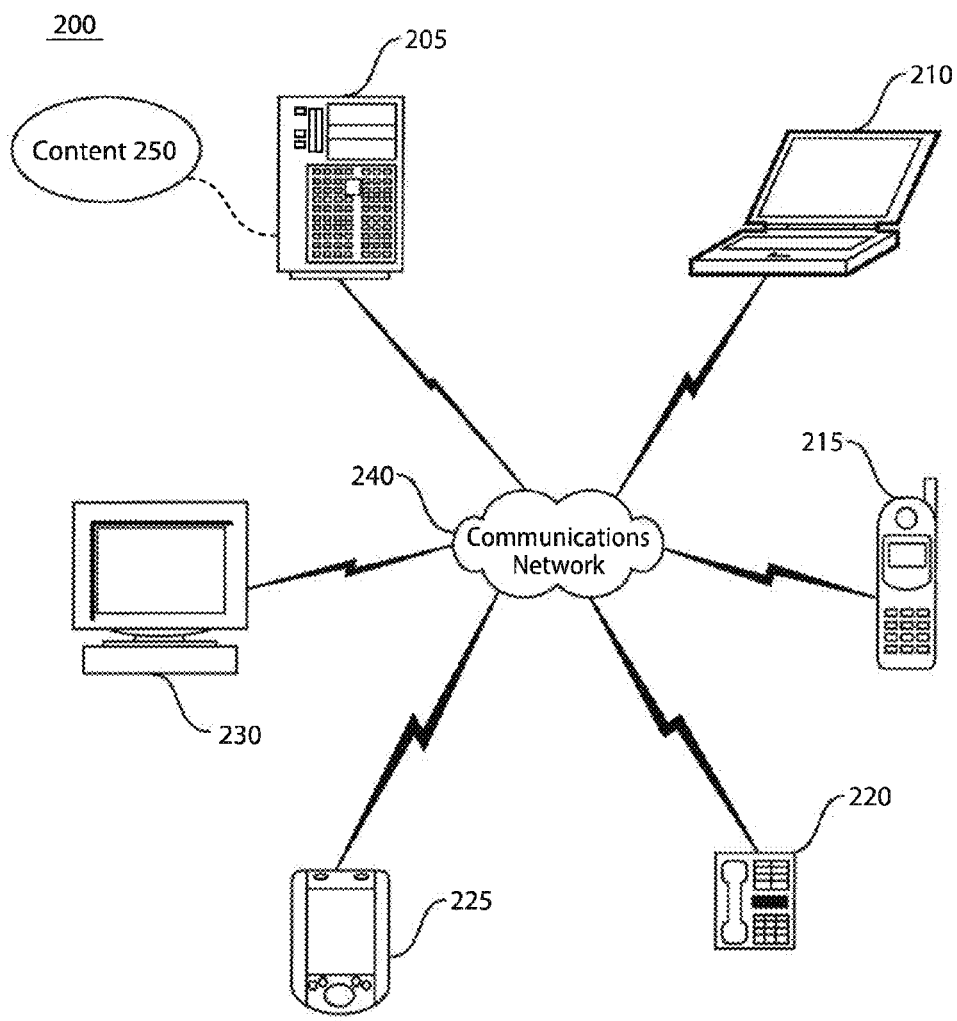
FIG. 2 is a block diagram showing an exemplary networked computing environment for use in accordance with herein described systems and methods.

As shown in FIG. 2, computing system 100 can be deployed in networked computing environment 200. In general, the above description for computing system 100 applies to server, client, and peer computers deployed in a networked environment, for example, server 205, laptop computer 210, and desktop computer 230. FIG. 2 illustrates an exemplary illustrative networked computing environment 200, with a server in communication with client computing and/or communicating devices via a communications network, in which the herein described apparatus and methods may be employed.

As shown in FIG. 2, server 205 may be interconnected via a communications network 240 (which may include any of, or any combination of, a fixed-wire or wireless LAN, WAN, intranet, extranet, peer-to-peer network, virtual private network, the Internet, or other communications network such as POTS, ISDN, VoIP, PSTN, etc.) with a number of client computing/communication devices such as laptop computer 210, wireless mobile telephone 215, wired telephone 220, personal digital assistant 225, user desktop computer 230, and/or other communication enabled devices (not shown). Server 205 can comprise dedicated servers operable to process and communicate data such as digital content 250 to and from client devices 210, 215, 220, 225, 230, etc. using any of a number of known protocols, such as hypertext transfer protocol (HTTP), file transfer protocol (FTP), simple object access protocol (SOAP), wireless application protocol (WAP), or the like. Additionally, networked computing environment 200 can utilize various data security protocols such as secured socket layer (SSL), pretty good privacy (PGP), virtual private network (VPN) security, or the like. Each client device 210, 215, 220, 225, 230, etc. can be equipped with an operating system operable to support one or more computing and/or communication applications, such as a web browser (not shown), email (not shown), or the like, to interact with server 205.

As used herein, the term "domain social network" is defined to include any connecting of a non-virtual, or virtual, identity with an Internet domain, such as based on ownership of or interests reflected on the domain on a network 240. More particularly, a domain social network may automatically feed domain data regarding the domains followed by each of the afore-discussed identities, such as domain data regarding available social media activities or events of likely interest to each of the identities based on the followed domain(s), such as via web service or email service, to the identities who follow those domains on a front end, and to the domains that are followed on a back end. The domain information, social media activities and performance events related to the domain(s) followed by a particular identity may further generate business intelligence as to the interests of that identity.

An Internet domain typically represents an identity, such as of a business, as well as the branding and reputation of that business. As such, a domain name constitutes a business asset. In some cases, reliance or trust placed in the brand associated with the domain name asset may be used maliciously, such as by hackers or others who use that trust to spread spam or viruses on the Internet.

Therefore, domain name owners need to protect and cultivate the use of their respective brands. In part, this cultivation necessitates that domain owners know the social media data and website performance data regarding the owned domain(s), as well as that of competitive domains or related domains. It is highly desirable to know this social media data and website performance data about domains of interest before making any judgment, or entering into any engagement, such as for advertising. Gaining this knowledge in advance regarding oneself, ones' competitors, and Internet third parties prior to entering into web-based engagements, is good Internet "citizenship," at least in that learning about domains and domain-related data before that data is used or shared with others helps stem the spread of bad web pages, malicious software and viruses, spam, and the like, to users who have placed their respective trust in particular domains.

Search engines and user-generated content platforms, such as Facebook or Twitter, could use domain-related data, if available, to value a domain, or an identity associated with a domain to filter and protect its content, data and users, such as in avoiding malicious or low quality content, and for advertiser's purposes. However, prior to the advent of the present invention and its domain social network, search engines and user-generated content platforms did not have access to such data. Rather, if such data was desired, one had to search for third party data tracking entities, and open one's site to allow such entity to track, piece-by-piece, the domain information desired. Thereafter, such data would have to be manually searched in order to make use of it, and this manual search would need to be repeated for each domain owned or in which there was interest.

The present invention provides an engine, system and method for a domain social network that interconnects Internet users with at least domains owned or interested by those Internet users, and that may obtain and/or forward the dynamic data automatically, such as by web service or email service. The dynamic data may be used to filter and protect content and data of the respective domains, to protect users by identifying low quality web pages or malicious software or pages, to isolate or improve search results regarding the domain, and/or to improve Internet-based deal flow, such as advertising.

Figure 3:
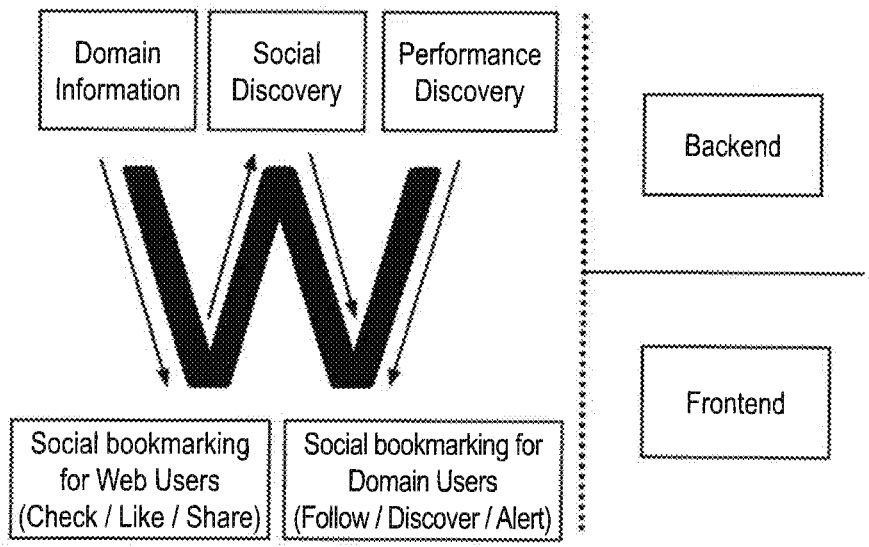
FIG. 3 is an illustration of aspects of the present invention.

In order to provide this engine, system and method, the present invention may include a front end engine and a back end engine, as illustrated in FIG. 3. Each of the backend engine and the front end engine may be or include, as discussed hereinabove with respect to FIGS. 1 and 2, at least one microprocessor, such as within a server, and at least one access node to at least one network, such as the Internet.

The backend engine, which may take the exemplary format illustrated in FIG. 3, for example, may automatically crawl and collect publicly available domain information, and may use that data to calculate a domain valuation (such as using a formula included in the aspects of the present invention) based on, for example, website traffic, number of followers/favorites markers, searchable page numbers and domain age.

The backend may also, for example, analyze a domain's "adult attribute," such as based on the domain link outs, keywords and the known adult attributes for certain domains. The backend may further compile domain-competitor data. The accumulated domain information may be generated, for example, as domain report data accessible to users. The access to this domain report data may be exposed, for example, by a browser bookmarklet, a browser add-on, or a domain social network website (hereinafter collectively "bookmarklet") that may provide a thin-client interface to reporting. Access may further include a vendor feed, such as via an application programming interface (API).

The domain social network bookmarklet may thus be, graphically, a front-end feature that is an add-on to any web browser. As such, it may be downloaded, or dragged and dropped or added via a favorites bar without a software download. In short, the bookmarklet may allow for "social bookmarking," that is, sharing of bookmarks with others, and indicating to domain owners whether a user has bookmarked the owned domain (such as for marketing/sales purposes).

The bookmarklet may give the user peace of mind for an unknown website (such as by giving linkouts, keywords, and website physical location, for example), or may allow a user to follow a known domain (such as by indicating the domain, giving an option to follow, providing keywords, and providing competitors, for example), at the user's direction and upon production by the browser, for example. All such information may, of course, be accumulated by the back end for production by the bookmarklet front end.

Further, the providing of the bookmarklet may greatly enhance page views, and thus may contribute to, and allow the provider of the bookmarklet to obtain a share of, enhanced advertising revenue. For example, if the user requests the bookmarklet, such as by clicking "Track" on any given web page, the user may be enabled to "Check" the site (to return or receive information from), "Like" the site (which will bring friends to the site), or "Share" the site (which will invite friends to the site), based on the information provided in the bookmarklet. This increased traffic to the site will provide increased ad revenue correspondent thereto.

More particularly, and by way of non-limiting example, via the bookmarklet any Internet user may access the domain information from the backend engine, such as by viewing any web page providing a "Check," as discussed hereinthroughout. The Internet user may, by way of non-limiting example, indicate a "Like," a "Share," or a "Follow" action, such as to save any web page, share any web page to third party, and/or to follow the indicated domain in the domain social network.

The Check process may also trigger the backend engine to perform business intelligence social discovery and performance discovery, as discussed hereinthroughout. An increase in the number of users may thereby generate more discovery data and more domain information, thus increasing the safety, knowledge, and hence enjoyment of all Internet users, while additionally improving web-based economic transactions, such as advertising. Yet more particularly, the backend may generate social discovery data and performance data based on a data request, such as, by way of non-limiting example, by way of a "Discover."

A user may, such as via the front end, join the domain social network, and such joinder may include definition of the relationship with owned or interested domains. This may, by way of non-limiting example, be termed a "Follow." Further, to increase the convenience of a "Follow," a group name or tag may be assigned to followed domains.

Figure 4:
FIG. 4 is an illustration of aspects of the present invention.

As more particularly illustrated in FIG. 4, the backend system may generate domain information which may include valuation data and adult attribute data, and provide such information to the frontend. This information may be accessible by the user through the use of, for example, the aforementioned browser add-on, bookmarklet, website service, email service or phone service, such as by allowing certain aspects of the domain information to be presented to the user. A user may also become a member of the domain social network so as to follow particular domains of interest, for example.

Thus, in a manner similar to that discussed herein for tracked sites, the front end bookmarklet may provide, either to a surfing user or a domain owner, critical information regarding the health of the domain. Users employing this feature may allow registered users to follow any domain for its website information, ranking, competitive analysis, and performance tracking, as well as for social discoveries about its domains. Again, information regarding these factors is accumulated by the backend of the present invention, and provided to the front end.

As further illustrated in FIG. 4, the user may thereby be presented with metrics relevant to the URL being visited or to be potentially viewed. In addition to tagging the URL in accordance with specific user preferences, the user may be provided information regarding the title of the website, the amount of traffic to the website in a given period of time, a summary correspondent to the content of the website, related or competitive websites to the one of interest, a listing of websites which a referenced or "link out" from the site of interest, and the website origination location, for example.

The backend system further has discovery capabilities, such as for social discovery and performance discovery. Accumulated domain information and discovery data may feed to domain social network members automatically, such as by web service, email service or phone service. Domain information data may further feed to third parties by API.

The backend may collect each domain's identity information, traffic information, link outs, link ins, following or favorites marking, and adult attribute data, and may therefrom calculate domain valuation based on traffic data, searchable page data and domain age data. For example, domain age (based on year number) may be a weighted factor in the valuation. Domain age of less than one year may be weighted at less than 1.0, wherein a lower valuation represents a lower popularity. For example, a domain age of less than a certain period, such as three months, may be particularly risky for Internet users. As such, a website having a lower valuation that requests user information may pose a particular risk to the user. If that web page provides a majority of its linkouts to a targeted website, then the risk to the user that the page is a phishing or scam page for the target website is even higher. When such high risk web pages are detected, the alert data of that high risk may be sent to the domain owner of the targeted website if it joins domain social network. Likewise, individual users may be informed of the high risk of the web page.

A user may login to the domain social network to check the alert data at anytime, for example. Alternatively, the alert data may be batch updated, such as daily. The user may check alert data for a specific domain, or may group several domains together and check alert data for that group. For example, a web message (such as a Tweet®) may include a web page link to a domain having a very new domain age, or an adult tag, or a low domain valuation, this data indicated by the performance discovery, and/or indicated by an alert, may preclude addition of this domain to search engine results, such as to avoid mass spread of a potentially harmful web page across Internet users.

This "performance discovery" may be executed from at least one cloud computing platform, such as in multiple regions. Periodically, such as once an hour, the backends from multiple regions may read the most popular pages from a domain to calculate its loading time and page size. The down time of specific web pages may also be calculated. For example, in an embodiment of performance discovery, web page size data may be read, and if it is similar to a previous checkup, a quick loading time calculation may indicate acceptable performance without reading the full web page data. This may significantly reduce bandwidth usage but nevertheless maintain reliable checkups. In another embodiment of performance discovery, if a domain report has not been used by any users for a period of time (thus indicating that the domain is not popular), the loading time checkup may continuously use the aforementioned quick loading time checkup, such as by reading only the header data of the web page and calculating loading time or down time.

A user who joins the domain social network of the present invention may use an email address for identification and for completing the validation process. User IDs may also be incorporated from other social networks approved by the user and/or associated with the identified email address, for example. As would be known to those skilled in the art, third party social network platforms already associated with the user, and in particular with the user's email address, for example, may be queried and associated with the user of the present invention.

Once associated with the present invention, a registered user may follow any number of selected domain names. The user may also receive reports providing information about the followed web site(s), which may further include information about related websites and the interactions between third party users and the related websites. Similarly, a user may follow users within the system and may be provided information about that and other users' internet activity.

As illustrated in FIG. 4, for example, a user who is following at least one additional user may be provided information related to what web site(s) were visited, the duration of each visit, the content accessed, the relation between the visited websites (and to the bookmarked web sites of the following or followed user), and/or the content available or bookmarked from the internet. A user may refine such information by limiting the presented information to various keywords matches, for example.

A user may also claim ownership of a domain through a validation process administered through the present invention, and may thereby gain access to a data or additional data related thereto. For example, domain owners may provide trademark and/or keyword data related to branding for inclusion with a user's alert data. However, some alert data may only be provided to the domain owner.

As described previously herein, a social bookmarklet or browser add-on may allow a user to reach a marked web page from any web browser in any web device (computer, tablet, smart phone, etc). The present invention may, for example, cause a popup window to display information having at least basic domain information related to a current web page. The same window may also provide information related to the Like, Share, and/or Follow features discussed herein, and may trigger social discovery data from a current web page, such as via the backend engine through to other users. As such, the present invention may provide a portable aspect, such as a widget, that may provide the data and inventive elements for users as discussed herein. Further, a unification of followed page data may be thereby provided.

As illustrated in FIG. 5, social discovery from a web page may be facilitated through the filtering of web page content and/or with the use of business intelligence logic to connect the web page information to the related domain. For example, the social discovery functionality of the present invention may allow a web page to contain a web link whose display text has the domain name and link to such domain, which may be provided to the user as related to the user's metrics whether such metrics are inputted by the user or calculated by the present invention based on the user's internet activity.

Social discovery data for domains may be represented using keywords indicating business intelligence rules. For example, a user may follow a keyword instead of a domain name, and in such a case the present invention may use domain information data to get the most matched domain list for that keyword. By way of example, the keyword "spyware" may be linked to one set of domains that have the most high valuation with "spyware" in their respective domain information data (i.e., in their respective domain name, title, description, keywords, etc.). The social discovery data for such keyword may then be converted to obtaining social discovery for the indicated domain list.

In a further exemplary embodiment illustrated in FIG. 6, a user may compile a certain subset of Check gathered information to determine whether a particular website meets the criteria the user has set, such as, for example, the website's popularity or overall access safety. Such information may include, for example, the topics covered by the website, the name of the website, the ranking provided by correlating third party usage, the number or ranking with respect to followers or favorite markers, a latest news posting, a social network posting related to the website, and/or the time between visits to the website by the user or a third party associated with the user, such as in the user's social network. Having such information available to the user may allow the user to make a determination as to the fitness and utility of the target website.

Such information may also allow a user to qualify the usefulness of a website without ever having actually landed on or been availed to the direct content of the particular website.

A user may also allow certain third party posts about particular websites to be displayed in the user's access panel. Such posts may provide a social network wherein the user may access opinion and content offered by the poster about the website of interest. Although such information may be included in the overall ranking associated with the website of interest, third party posts may include more detailed information and may allow the user to make a more refined decision as to the quality of the web site.

For example, a commenting user may provide a link to the web site being commented upon and may include a statement form original authorship or copy and paste some prior created content—whether directly from the web site being commented on or related content from a third party source. In any event, the present invention may also associate with the post information related to the web site, such as, for example, the ranking of the web site and an indication of when the post was created.

As further illustrated in FIG. 6, an alert may be based on user grouped domains to present the latest down time data and latest social discovery data. Similarly, an alert may send an email once a day to a domain user for latest social discovery data based on user followed domains and may send instant communications to a domain user when detected down time based on used followed domains.

Finally, FIG. 7 is an illustration of the following of a domain (symantec.com in this case), and the obtaining of social discovery data and domain information related thereto. This information may be shared, in accordance with the present invention, such as by email, with other users who may read the social discovery data and elect to also follow the domain. Thereby, the present invention provides viral marketing of the domain. Further, in this exemplary embodiment, the social discovery data may reveal the discovery by the domain of a security flaw and data leak by a third party website, and multiple media websites with a link to the domain. Thus, the story may be cached by the backend and linked to the domain.

As described herein, the present invention may be used on any GUI functional electronic device, such as, for example, desktop PCs, mobile phones, tablets, smart watches, smart clothing, and similarly functional items as would be appreciated by those skilled in the art. Although maximum functionality may be enjoyed when access to the web is enabled, the present invention may operate on a closed network and/or in an "offline" manner. The GUI and underlying programming may support the syncing of web-based content, such as a browser view, for example, audio/video(s)/photo(s) resident on the web or local to at least one device, and location information between users, which may result in geo-based smart data exchange, for example. Such an exchange may allow at least two users to share information and to be location-aware of not only each other, but of occurrences for which they may have an association. Similarly, language barriers may be limited or neutralized by allowing for the translation of content between users of known language differences.

As further described herein, the present invention may provide for the syncing of media content between devices, for example, allow for the grouping of photos and media by locations and users, allow for the tagging of media, allow for audio to be paired with photos, and allow for the sharing of media content with third party social networks. The present invention may also provide for the creation of channel and allow for physical movement of a device to activate various device actions, for example.

Figure 8:
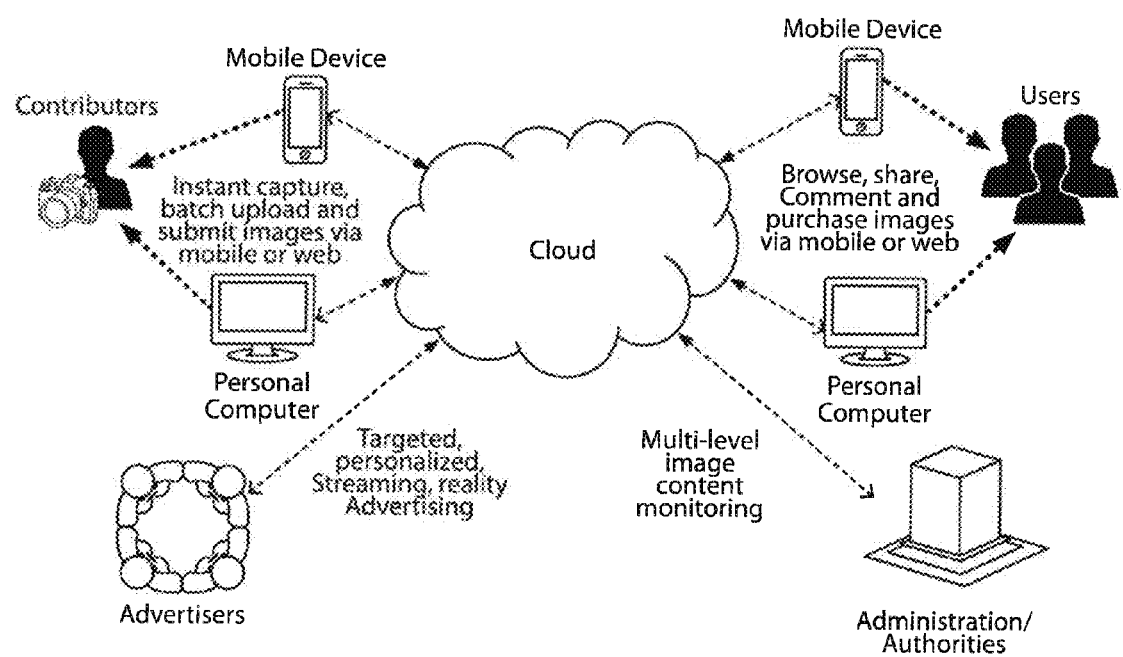
FIG. 8 is an illustration of aspects of the present invention.

As illustrated in FIG. 8, the present invention may allow for interconnection through at least one cloud based server and may allow for content monitoring of the at least one stream of information passing between at least two of a plurality of users. For example, a contributor may capture/create certain media via a mobile device and share such media through the present invention for it to be made available to at least one additional user. The media associated with the present invention may be interrogated and may have identified various characteristics and parts, such as, as discussed herein, any included URLs, embedded links, users attributes, and time and/or location information, for example. Such an interrogation may also identify and flag and/or neutralize malicious programs and/or URLs, as discussed above.

At least a portion of the information gathered through at least the interrogation of at least one media may be used to identify suitable advertising which may be associated with either the contributor of the media, a user of the system who may have accessed the media or like content (including media having similarly based interrogation results) or the media itself. As will be appreciated by those skilled in the art, the use of various ad delivery techniques may be employed and may, for example, be in the form of targeted ad delivery based on information collected about a particular user of the system.

A non-contributor to the system (who may at some point be a contributor, for example) may browse, share, comment, purchase, and/or otherwise interact with media accessible through the present invention. Users may be limited to the media made available to them by strict per user access rules and/or association with one or more occurrences, as discussed herein.

Figure 9:
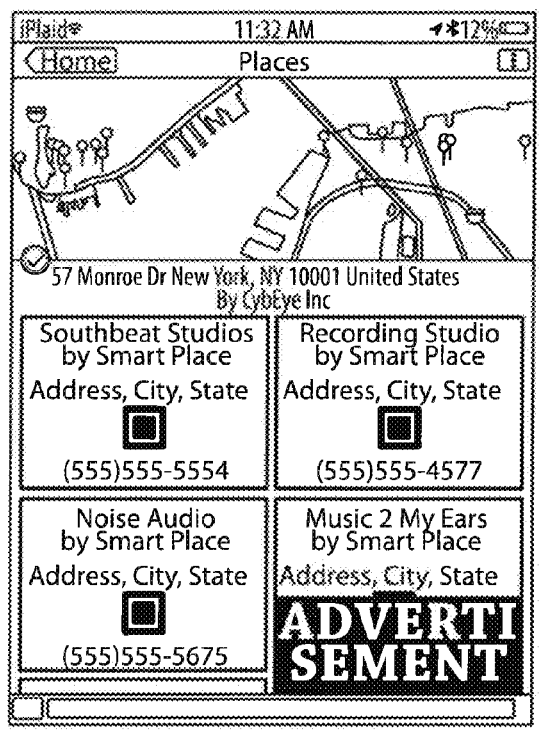
FIG. 9 is an illustration of aspects of the present invention.
Figure 10:
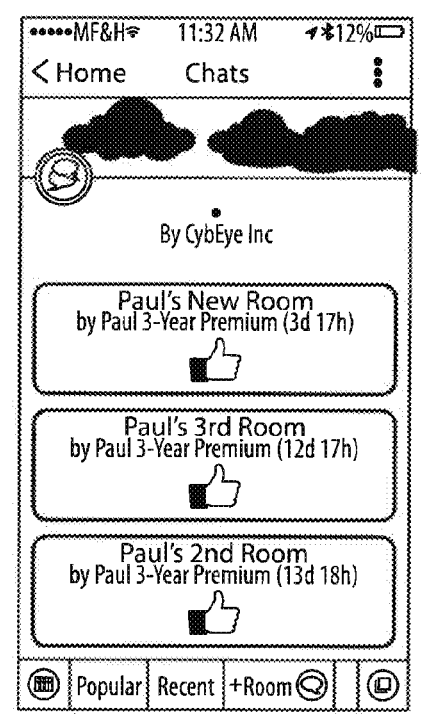
FIG. 10 is an illustration of aspects of the present invention.

As illustrated in FIG. 9, the present invention may allow for the display of location based information which may be presented in the form of a map display, for example, and/or other icon representations. For example, a meeting between at least two users of the present invention may be noted by an icon which may be selected and which may indicate, not only the location of the meeting, whether virtual and/or physically located, but also information which may be associated with the meeting, such as communication particulars, participant information, rules, and/or topics for the meeting, for example. In this way, the present invention may provide a hosting environment for various groups of friends, business colleagues, family members, and the like. The location information presented and/or utilized by the user, including the user's own location, may be used to provide ad delivery, as discussed herein, which delivery may be based on, in part, the users location information as well as other meeting information.

The present invention may also provide for communication between users and may, conveniently provide such communication features such as text-based chatting, for example. Although a communication gateway between users may be provided in any manner appreciated to those skilled in the art, the use of a chat-based communication may provide more easily modularized access and containment of certain communications. For example, a meeting with a user named Paul may have three communication points which may be associated with a location name, such as, for example, New Room, $3^{rd}$ room, and $2^{nd}$ room. In this way, communication traffic may be coordinated and controlled by rules defined by a user.

Figure 11:
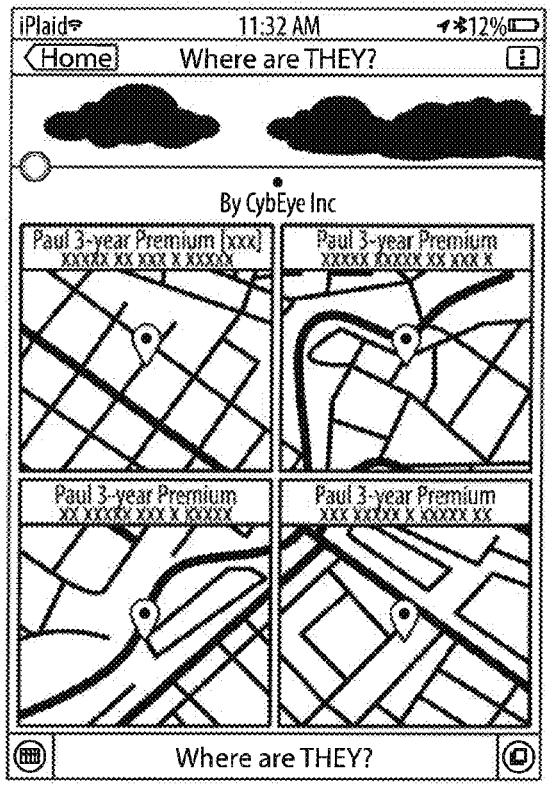
FIG. 11 is an illustration of aspects of the present invention.

If, for example, users are in a virtual room, location information regarding each user may be made available to at least one user and may, for example, take the form of a map as illustrated in FIG. 11. This functionality may allow a user to better determine what the physical availability of participants, for example, and may be an indication of what each participant may be doing (e.g., if the participant is in an expected location). As would be appreciated by those skilled in the art, such a location display of users may be used to show any users of the present invention and not so limited to those engaged in a particular meeting and/or communication link.

Figure 12:
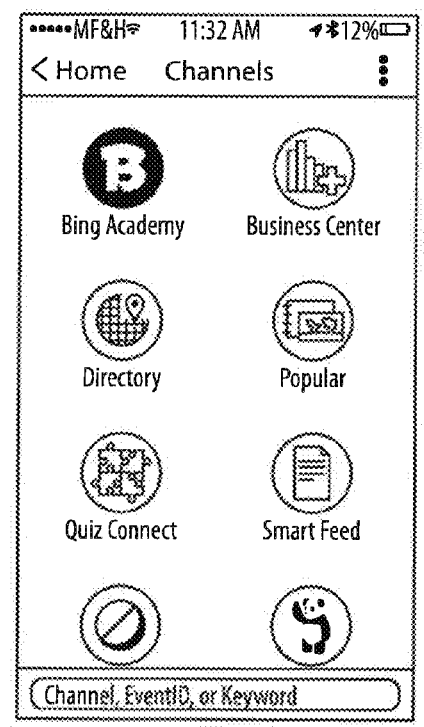
FIG. 12 is an illustration of aspects of the present invention.

To better navigate the various function discussed herein, a channel may be created to better organize various features provided by the present invention. For example, as illustrated in FIG. 12, channels may be presented for selection by a user and may be created by a user who may, in turn, define the information and/or functionality accessible through a particular icon. For example, the "Bing Academy" may be a customized channel providing a specific line of information, for example. Similarly, the "Popular" channel may be a channel present by the present invention without user customization and may aggregate various content/information/apps that are deemed to be used more than other such features in accordance with rules which may be predefined to provide a limited number of "popular" features.

Figures 13, 14:
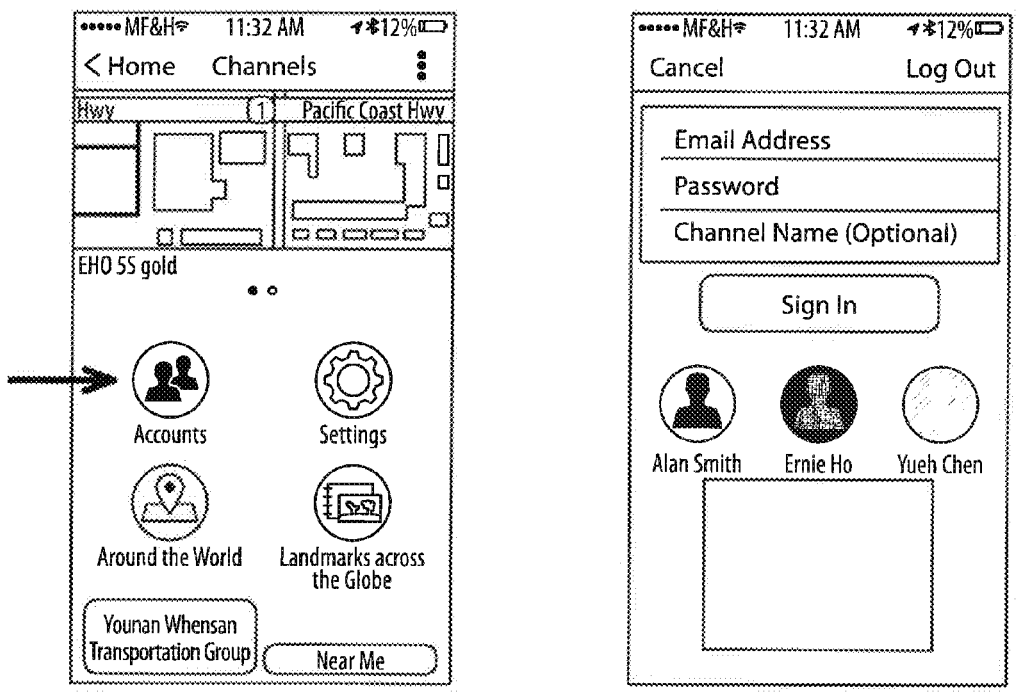
FIG. 13 is an illustration of aspects of the present invention.
FIG. 14 is an illustration of aspects of the present invention.

Additional functionality may be provided by the present invention as illustrated in FIG. 13, which may allow a user to access account information and settings which may provide at least one rule to be applied within the system in association with the user and/or the user's associated meetings/communications. As illustrated in FIG. 14, a user profile may be selected and may be provided the opportunity to log into the system using at least one password and/or security profile.

Figure 15:
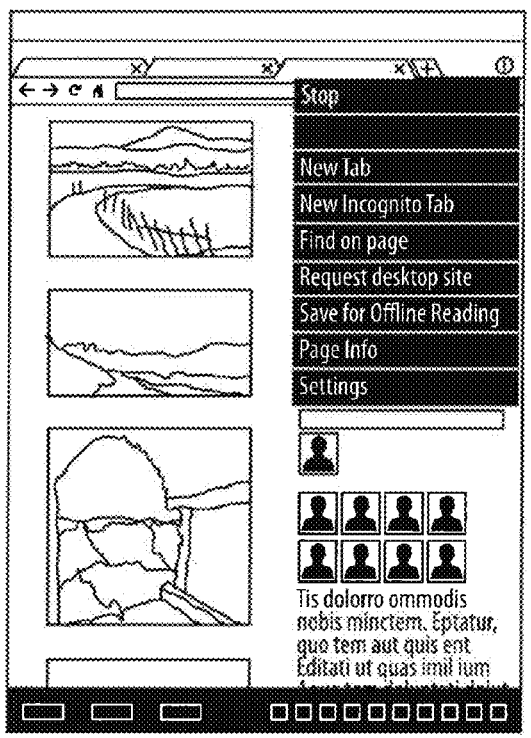
FIG. 15 is an illustration of aspects of the present invention.
Figure 16:
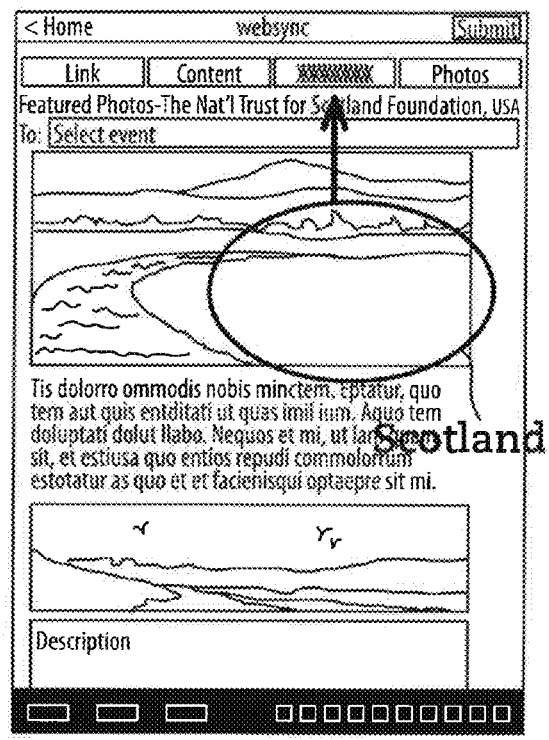
FIG. 16 is an illustration of aspects of the present invention.
Figure 17:
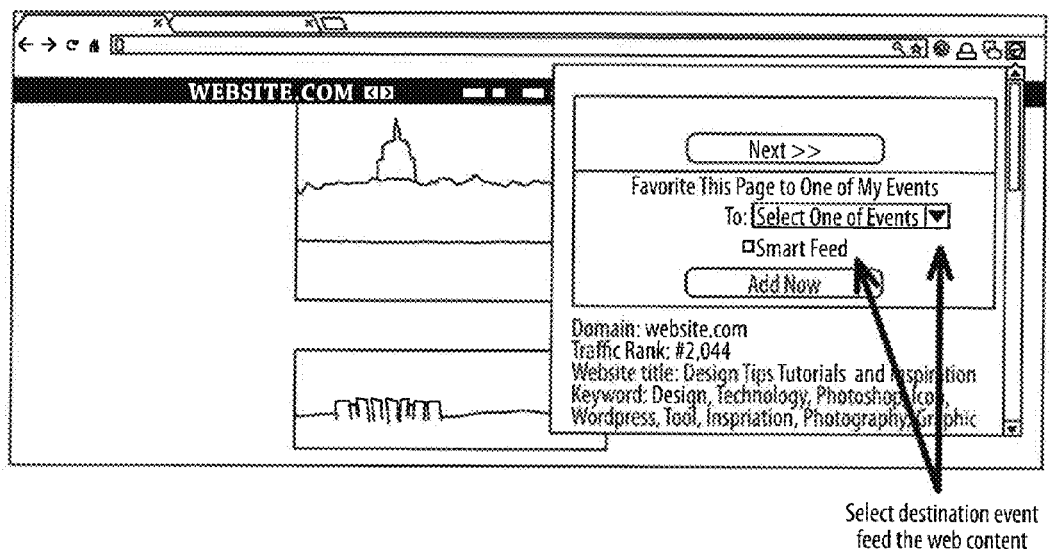
FIG. 17 is an illustration of aspects of the present invention.

A feature provided by the present invention may include the sharing of content from one device to another, as described above, and may allow for the easy sharing of a web page between mobile devices as illustrated in FIGS. 15 and 16. Accessing the present invention may be provided through at least one access point 1501 which may, when activated, provide at least one menu 1502 which may include, for example, access to share functionality. Although such a link may directly share to a designated user the web page URL, for example, additional options may include the send of a screen shot, as illustrated in FIG. 16, for example. The same functionality may be provided on a desktop PC and/or tablet, such as illustrated in FIG. 17, for example.

Figure 18:
FIG. 18 is an illustration of aspects of the present invention.
Figure 19:
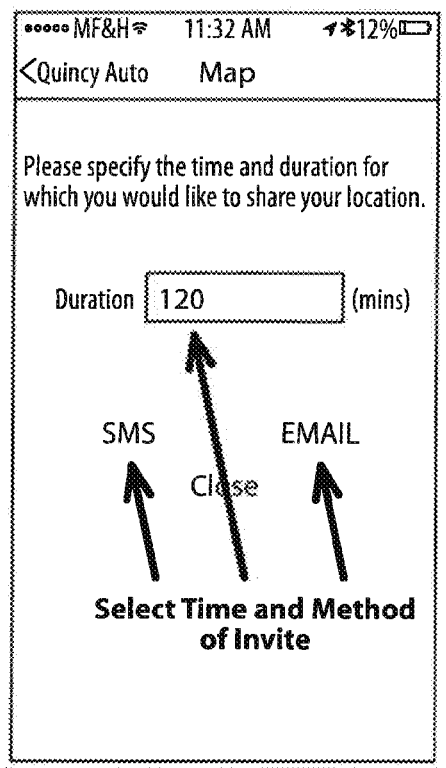
FIG. 19 is an illustration of aspects of the present invention.

As discussed above, the location information related to any user may be shared throughout the system. To prevent misuse of such information, for example, a user may be prompted to allow for the sharing of location information as illustrated in FIG. 18. In addition, if the user allows the location information to be disseminated, a user my further provide rules and/or limits on how long location information may be presented and by what means the user may be contacted, as illustrated in FIG. 19. In this way, a user may "expose" their location and use of the system and may then be invited to a meeting and/or otherwise interacted with for at least some user defined period of time.

Figure 20:
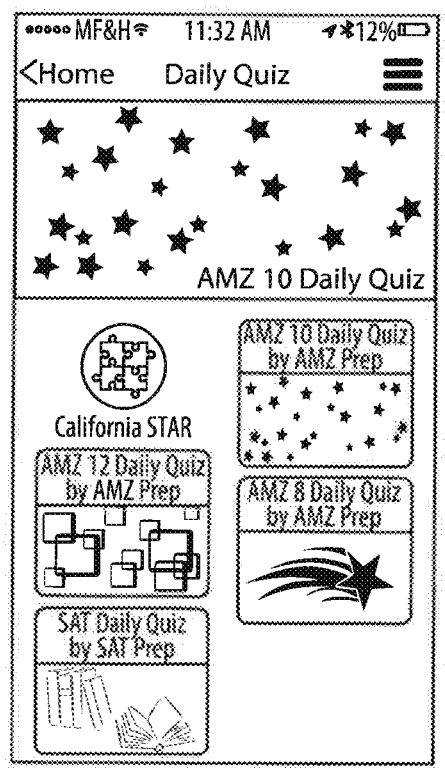
FIG. 20 is an illustration of aspects of the present invention.
Figure 21:
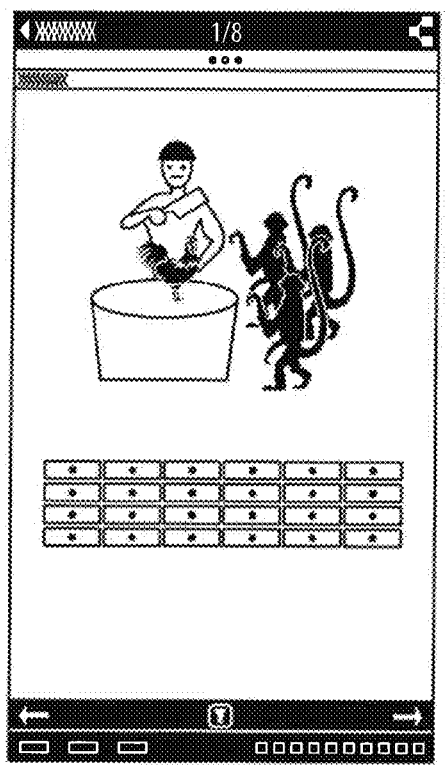
FIG. 21 is an illustration of aspects of the present invention.

The present invention may also be used to provide a platform which may provide a quiz or other query and/or educational enabled GUI such as illustrated in FIGS. 20 and 21. In this way, users may be invited to join a game and may organize a "meeting" around a game to increase participation and the effect of the game.

Figure 22:
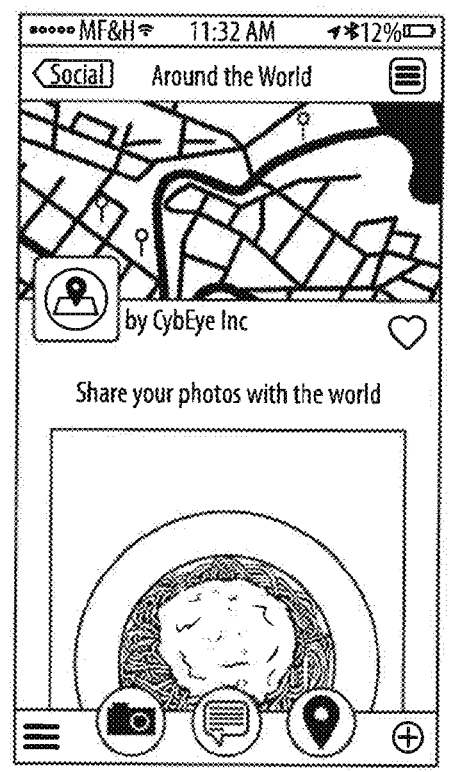
FIG. 22 is an illustration of aspects of the present invention.

The present invention may also provide a location-based media sharing platform, such as the exchange of photos taken with a mobile device, for example. As illustrated in FIG. 22, such a feature may include at least some information regarding the location of the user and/or the location of the photo taken. The user may be presented with the option of posting the photo to a particular channel, publishing the photo to a third party social network, sending to photo to another mobile device, and/or pinning the photo to the location to record the origin of the photo. Photos may be stored by the present invention and cataloged with time and/or location information to allow for searching and retrieval by, for example, location and/or user.

Figure 23:
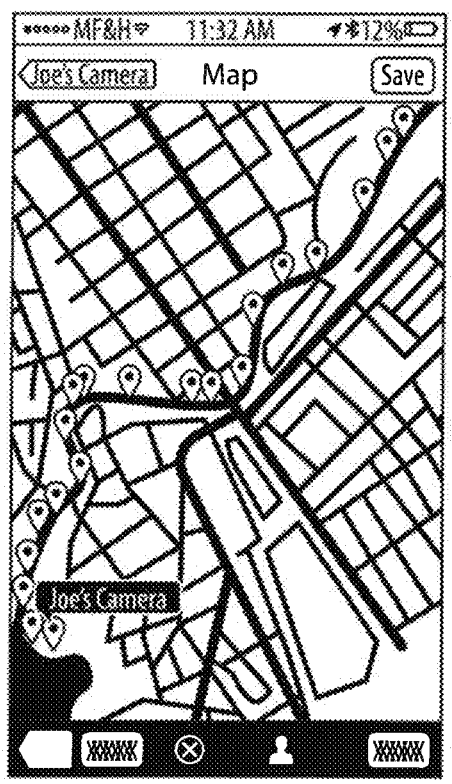
FIG. 23 is an illustration of aspects of the present invention.

The present invention may also track, in a predefined manner, the location of at least one mobile device. For example, a user may set at least one rule set which may cause the present invention to record the location of the mobile device every 10 minutes, for example. Similarly, information collected may further include what apps/programs/URLs are being accessed/utilized by the mobile device at the time of recording. In this way, a record of the device location and utilization may be recorded by the present invention. As illustrated in FIG. 23, for example, the location of a mobile device may be periodically recorded and mapped as the device moves between two metropolitan areas. A user of the present invention who may have access to this information may, for example, simply select a pin which may be associated with the information collected at the designated interval.

Figure 24:
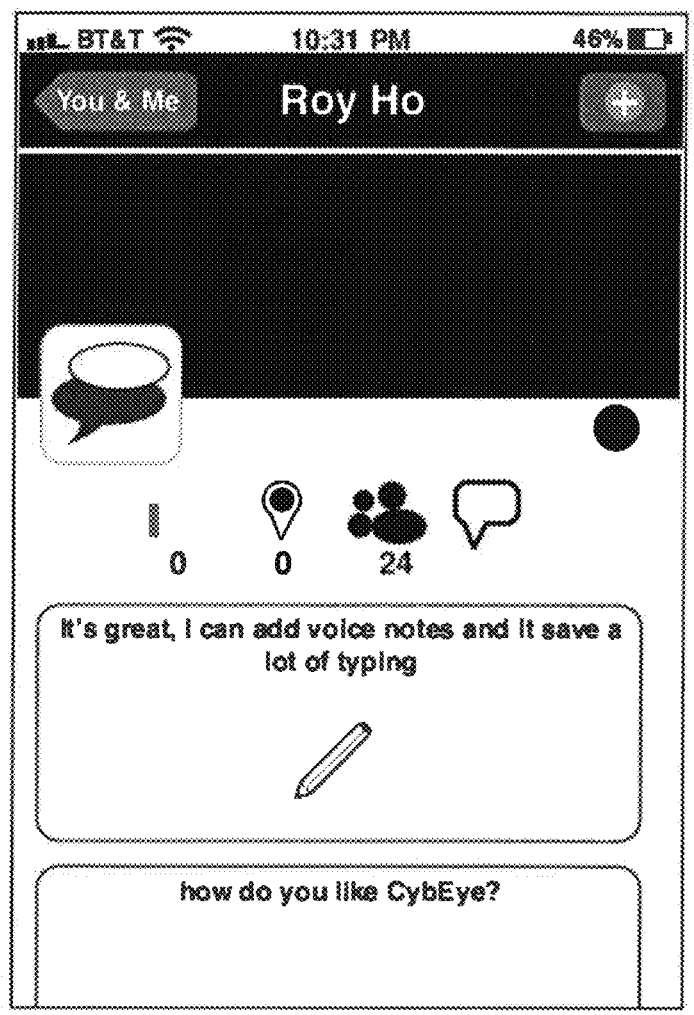
FIG. 24 is an illustration of aspects of the present invention.

As illustrated in FIG. 24, the present invention may provide a GUI which may allow for the easy organizing and managing of chats within and/or between events. As described herein, limits may be placed on the distribution of such communications within the system and may allow for group communication/chat within a channel, for example.

Figure 25:
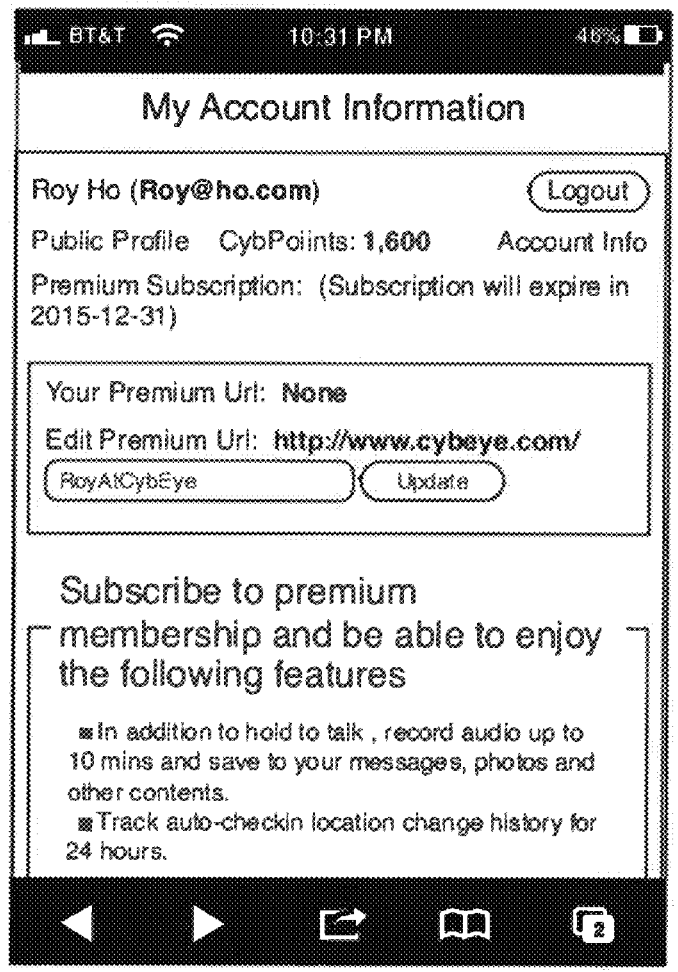
FIG. 25 is an illustration of aspects of the present invention.

As illustrated in FIG. 25, a user may have access to account information such as, for example, user name, contact info, system subscriber information, assign channels between users, tag media to a channel(s), and/or use and/or purchase system points for use in buying services and/or goods.

Figure 26:
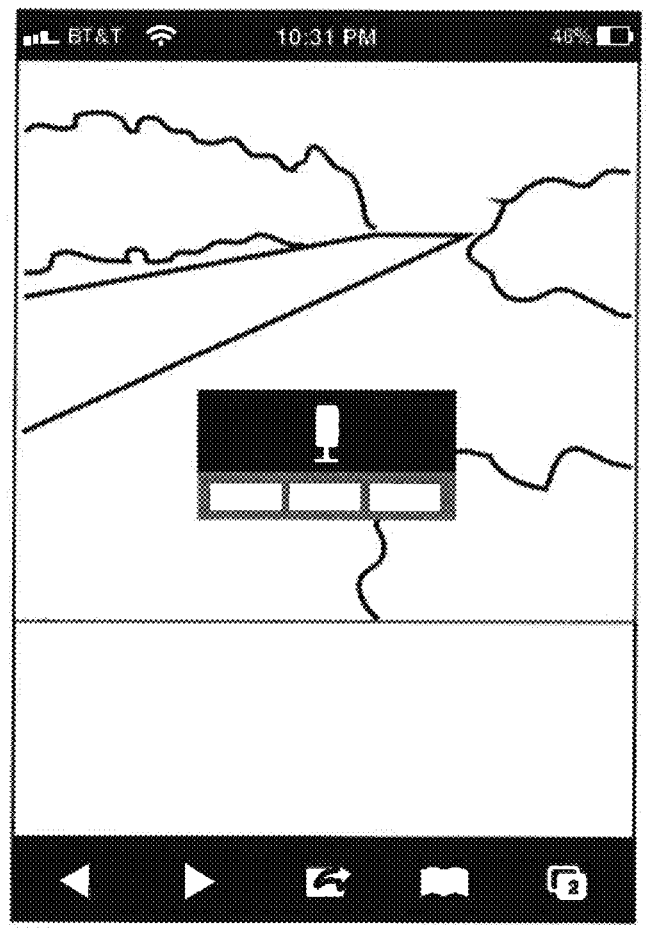
FIG. 26 is an illustration of aspects of the present invention.
Figure 27:
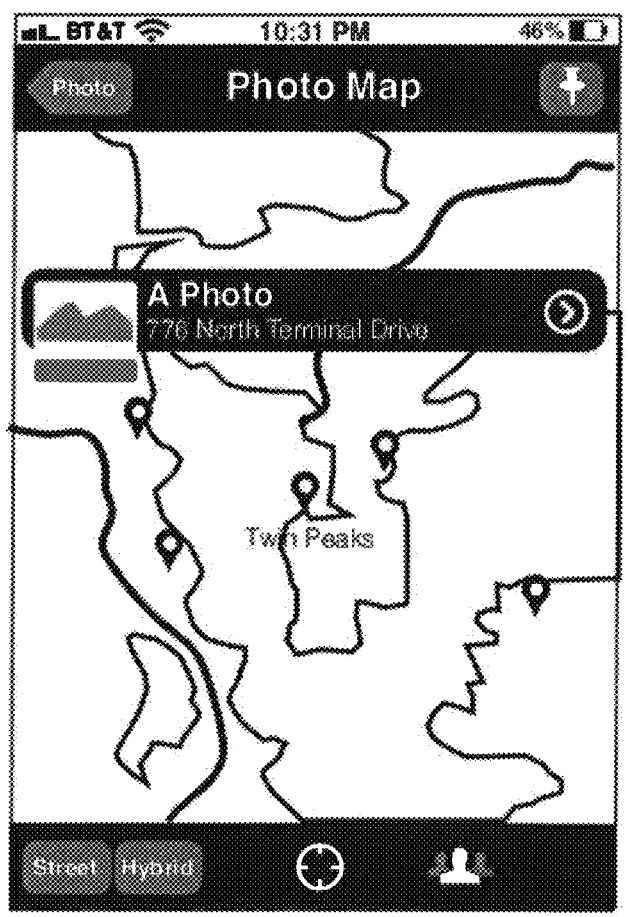
FIG. 27 is an illustration of aspects of the present invention.

Although information and media may be imputed into the present system in various ways known to those skilled in the art, as illustrated in FIG. 26, a GUI interface may be provided to allow for the recording of media on to a mobile device for subsequent use in the system. Additionally, a microphone icon, for example, may be provided to allow for a user to add commentary or other verbal direction and associate the same with the uploaded media. Any media created by the enable mobile device, for example, may be associated with location information. As illustrated in FIG. 27, media such as photos, for example, may be located by the present invention on at least one map. Such a feature of the present invention may also share, automatically, media with an event/user automatically.

Figure 28:
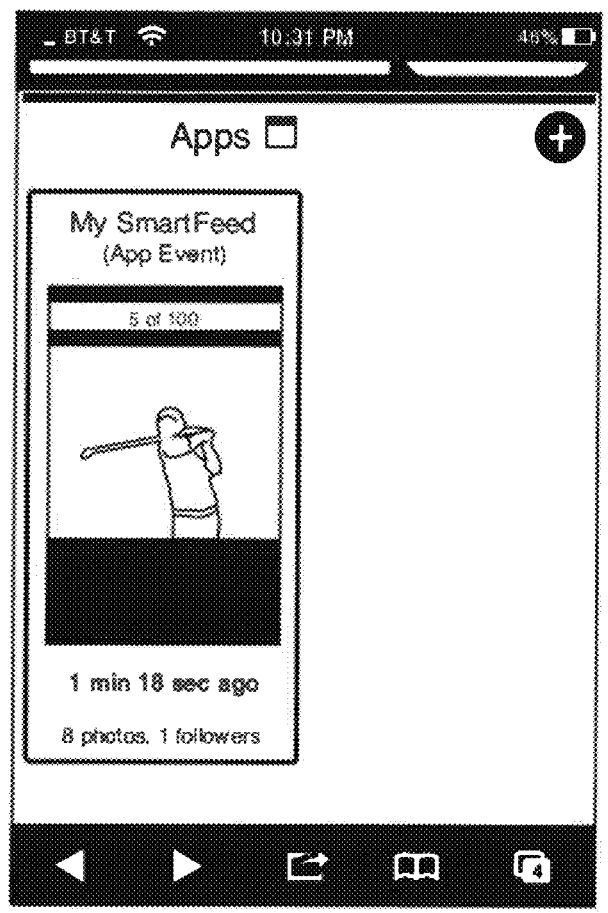
FIG. 28 is an illustration of aspects of the present invention.
Figure 29:
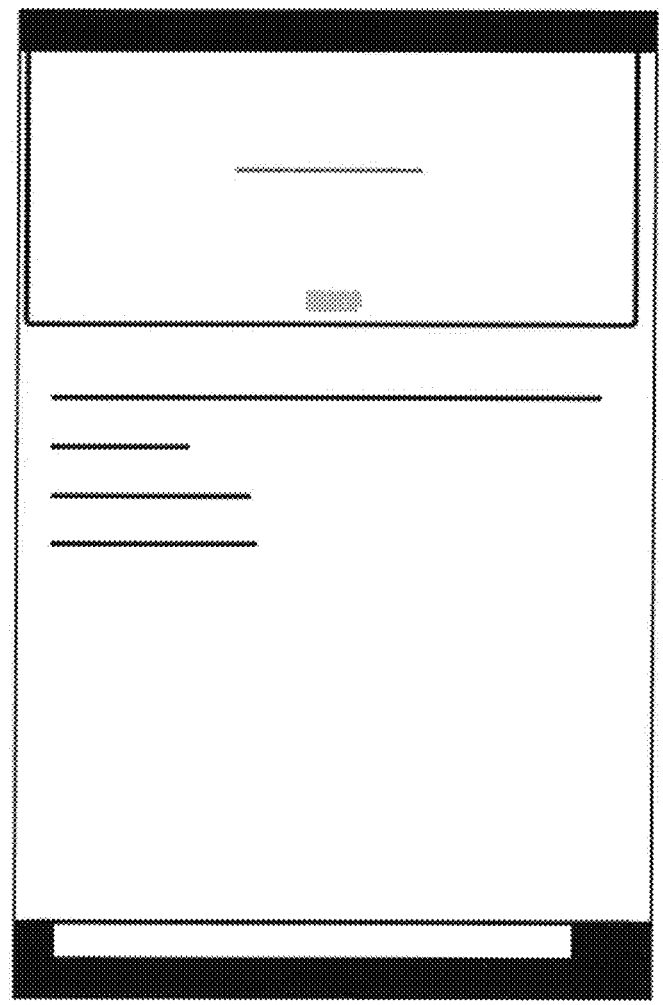
FIG. 29 is an illustration of aspects of the present invention.
Figure 30:
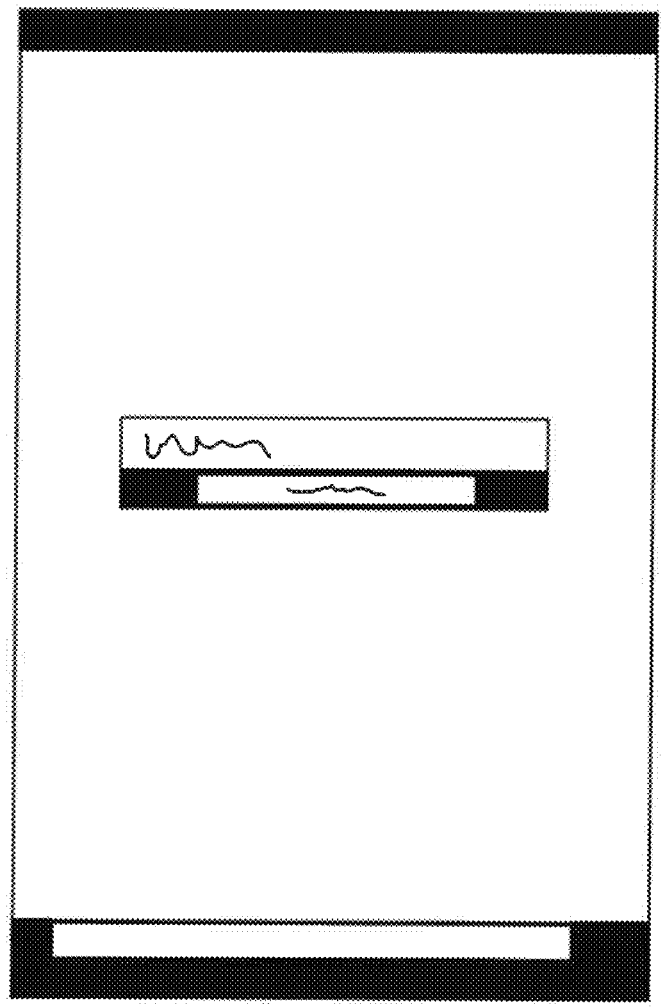
FIG. 30 is an illustration of aspects of the present invention.

Similarly, as illustrated in FIG. 28, media may be shared through at least one channel and may be tagged as such and/or may be automatically feed into a channel. Media may also be tagged to at least one keyword which may allow for more easily searching within the system. As illustrated in FIGS. 29 and 30, communication in the system may be user/host controlled and may allow for text and audio to be combined. Similarly, audio that is longer than typical chat communications may be broken into smaller pieces of about ten minutes.

Figure 31:
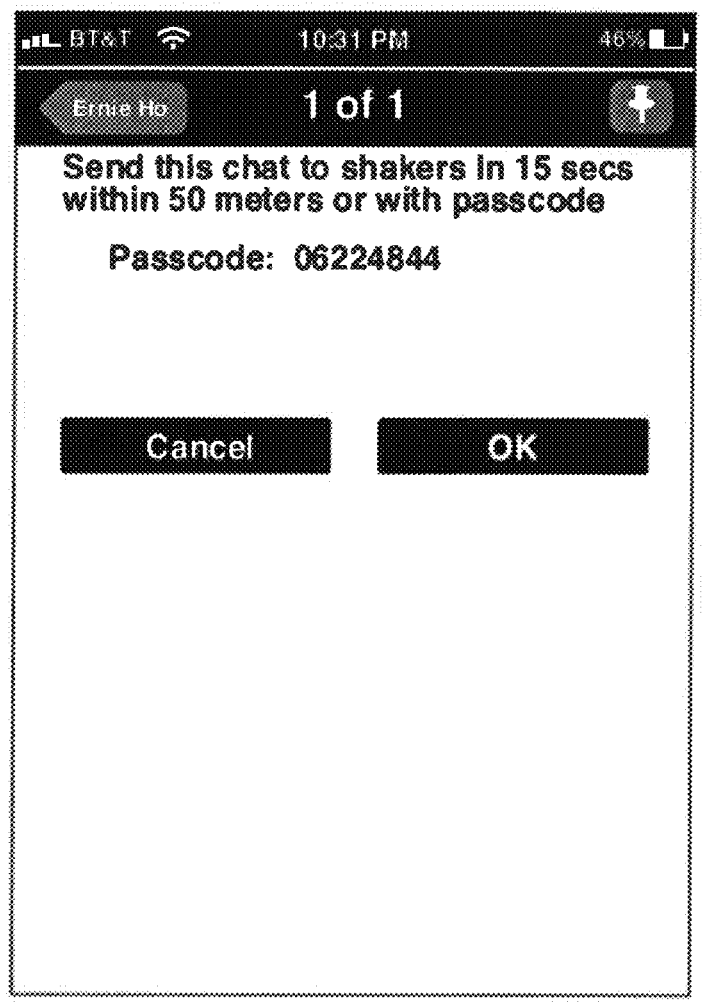
FIG. 31 is an illustration of aspects of the present invention.

In an embodiment of the present invention, media may be automatically tagged with at least the time, location, and/or associated event information. Further, as illustrated in FIG. 31, media may be shared by "shake and share" through movement of a mobile device and may also be secured with at least one passcode. The user may also set the time for which the mobile device needs to be "shaken" and in what manner to effectuate the desired feature.

Figure 32:
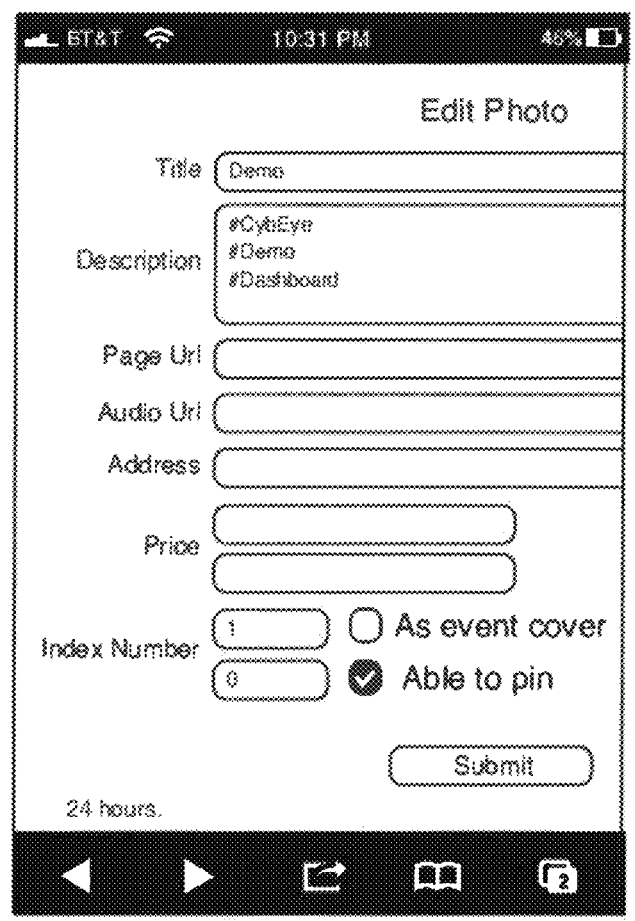
FIG. 32 is an illustration of aspects of the present invention.
Figure 33:
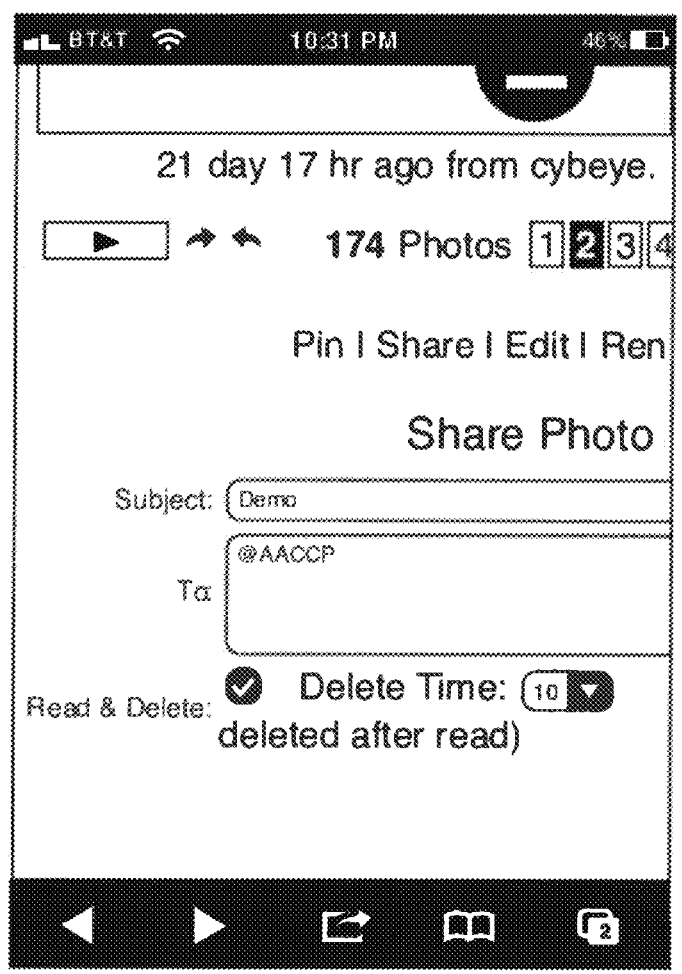
FIG. 33 is an illustration of aspects of the present invention.

Additionally, as illustrated in FIGS. 32 and 33, the present invention may allow for the searching and configuration of the posted media. The present invention may allow, for example, information from at least two sources, such as, for example, two URLs. The media may be tagged, as described above, and may allow and/or limit the media to specific viewing times, locations, and or events.

Those of skill in the art will appreciate that the herein described systems and methods are susceptible to various modifications and alternative constructions. There is no intention to limit the scope of the invention to the specific constructions described herein. Rather, the herein described systems and methods are intended to cover all modifications, alternative constructions, and equivalents falling within the scope and spirit of the invention and its equivalents.

What is claimed is:

1. A system for providing a domain social network, comprising:
    a first aspect of a backend engine, comprising computing code executed by at least one server for interconnecting Internet node points with at least first domains owned by ones of the Internet node points;
    a second aspect of the backend engine, comprising computing code executed by at least one server for interconnecting others of the Internet node points with at least second domains of interest to the others of the Internet node points;
    wherein the backend engine further obtains dynamic data regarding at least the first and second domains and at least one user associated content;
    wherein the dynamic data is capable of indicating at least one aspect suitable for the targeted delivery of at least one ad to the at least one user;
    a frontend engine, comprising computing code embodied on a non-transitory computer-readable medium executed by at least one hardware processor configured to display, via a bookmarklet, the ad; and
    the frontend engine is further configured to receive, via the bookmarklet, data entry from the user;
    wherein the data entry comprises at least one of: follow a domain, check a domain, and like a domain.

2. The system of claim 1, wherein the dynamic data comprises information associated with the number of URLs located in at least one communications stream.

3. The system of claim 2, wherein at least one frequency score related to the number of URLs is calculated.

4. The system of claim 1, wherein the at least one user associated content comprises a URL.

5. The system of claim 1, wherein the at least one user associated content comprises a listing of user visited URLs.

6. The system of claim 1, wherein the user is provided at least one web page comprising at least one URL link comprising at least a partial display of text having the domain name of the at least one URL.

7. The system of claim 1, wherein the dynamic data is selectively added to at least one database.

* * * * *